Patented Jan. 25, 1944

2,340,111

UNITED STATES PATENT OFFICE 2,340,111

PROCESS FOR REMOVING CATIONS FROM LIQUID MEDIA

Gaetano F. D'Alelio, Pittsfield, Mass., assignor to General Electric Company, a corporation of New York No Drawing. Application July 3, 1942, Serial No. 449,680

12 Claims. (Cl. 210—24)

The present invention relates to a process for treating liquid media. More particularly, this invention relates to a novel method of removing cations from liquid media such as by contacting the liquid media with a mass comprising an infusible, insoluble copolymer containing carboxyl groups.

Many natural and synthetic compositions have been proposed for removing cations from solutions. Such materials to be useful must possess the following properties:

1. They must contain either a chemical group which will react with the cation or have an activated surface which physically adsorbs the cation.
2. They must be capable of regeneration to at least part of their original activity so that they may be reused.
3. They must be insoluble in the liquid media before and after removing cations from the media. Thus if an acid were used as the treating agent it would have to be insoluble both as the acid and as the salt since the acid is the form before adsorbing cations and the salt is the form after adsorbing cations.

Soluble and fusible polymers and copolymers containing free carboxyl groups are known. For example, polymerized acrylic acid and polymerized alpha-substituted acrylic acid and their water-soluble derivatives, e. g., their sodium salts, have been proposed as emulsifying agents. Salts of copolymers of methacrylic acid with monohydric alcohol esters of methacrylic acid are described as water-soluble and useful as sizing and tanning agents. Such polymers and copolymers would, therefore, be unsuitable for removing cations, such as sodium ions, from water since in so doing the resins themselves would dissolve.

I have now discovered that cations may be removed from liquid media by contacting such media with a mass comprising an infusible, insoluble copolymer of a polymerizable mixture comprising (1) at least one polymerizable compound containing a polymerizable

grouping and at least one other polymerizable grouping, the unsaturated bonds of the said polymerizable groupings being non-conjugated with respect to each other, and (2) at least one acrylic acid having the structural formula

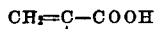

where R is a substituent selected from the class consisting of hydrogen, chlorine, bromine, monovalent alkyl radicals, monovalent aralkyl radicals, monovalent aryl radicals and monovalent alkaryl radicals.

Illustrative examples of monovalent alkyl, aralkyl, aryl, and alkaryl radicals represented by R in the above formula are: methyl, ethyl, propyl, isopropyl, butyl, secondary butyl, isobutyl, tertiary butyl, amyl, heptyl, octyl, decyl, cyclopentyl cyclohexyl, phenyl, tolyl, xenyl, naphthyl, xylyl, propylphenyl, ethylphenyl, benzyl, phenylethyl, etc. Preferably R is hydrogen or the methyl radical.

Any suitable method may be used in preparing the insoluble, infusible copolymers for use in my invention. For example, the liquid monomeric liquids may be mixed and polymerized in the presence or absence of a solvent or a dispersion medium for the monomers, by the use of heat, light, or heat and light in the presence or absence of a polymerization catalyst, at atmospheric, subatmospheric or superatmospheric pressure.

Suitable catalysts are the peroxides, e. g., benzoyl peroxide, sodium peroxide, hydrogen peroxide, acetyl benzoyl peroxide, etc.; the per-compounds, e. g., ammonium persulfate, sodium persulfate, sodium perchlorate, sodium perborate, potassium persulfate, etc.; ozone; ozonides; etc. Additional examples of polymerization catalysts which may be used are found in my U. S. Patent 2,260,005, issued October 21, 1941, and assigned to the same assignee as the present invention.

Instead of starting with monomeric materials, I may start with partially polymerized materials or with mixtures of monomeric and partially polymerized materials.

After polymerization is complete, the product is isolated, if a solvent or dispersion medium was used, and ground to a granular form. All factors being equal, the finer the granular form or the more surface that is exposed, the more effective the copolymer is in removing cations from solution.

When liquid media having various cation impurities dissolved therein are brought in contact with these insoluble, infusible copolymers containing carboxyl groups, the cations, e. g., sodium ions, calcium ions, lead ions, magnesium ions, iron ions, etc., react with the carboxyl groups to form salts which are also insoluble and infusible. The cations are, therefore, effectively removed from solution.

After the resin has adsorbed the cations it can readily be regenerated to its original effectiveness by washing with a dilute acid, preferably a mineral acid which forms soluble salts with the adsorbed cations. In some cases the effectiveness of the copolymers used in my invention is increased by regeneration perhaps due to an increase in the amount of surface exposed. In the case where an ester or nitrile of an acrylic acid is present in the copolymer, the increased effectiveness may be due to the hydrolysis of some of the ester groups to the alcohol and acid or of the nitrile groups to the acid thus making available more carboxyl groups which are capable of removing cations.

Such a scheme could, therefore, alternatively be used in preparing the copolymers used in my invention. That is, an acrylic ester or nitrile may be used in place of part or all of the acrylic acid in preparing the copolymer followed by hydrolysis of the ester groups to the corresponding alcohol and acid or of the nitrile to the corresponding acid. However, I have found it more satisfactory and prefer to use an acrylic acid as one of the starting ingredients.

Illustrative examples of suitable acrylic and alpha-substituted acrylic acids which may be used in preparing the copolymers are:

Acrylic acid
    Methacrylic acid
    Alpha-chloroacrylic acid
    Alpha-bromoacrylic acid
    Alpha-phenylacrylic acid
    Alpha-ethylacrylic acid
    Alpha-tolylacrylic acid
    Alpha-phenylethylacrylic acid
    Alpha-propylacrylic acid
    Alpha-butylacrylic acid
    Alpha-ethylphenylacrylic acid
    Alpha-cyclopentylacrylic acid
    Alpha-cyclohexylacrylic acid
    Alpha-heptylacrylic acid
    Alpha-octylacrylic acid Illustrative examples of suitable compounds containing at least one polymerizable

grouping and at least one other polymerizable grouping, the unsaturated bonds of said polymerizable groupings being in a non-conjugated system are:

Allyl acrylate
    Methallyl acrylate
    Allyl methacrylate
    Crotyl acrylate
    Crotyl methacrylate
    Allyl ethacrylate
    Allyl cinnamate
    Propargyl acrylate
    Methallyl methacrylate
    Ethallyl acrylate
    Ethallyl methacrylate
    Allyl alpha-phenylacrylate
    Allyl alpha-chloroacrylate
    Diallyl phthalate
    Dimethallyl phthalate
    Dipropargyl phthalate
    Diallyl maleate
    Diallyl succinate
    Diallyl oxalate
    Diallyl itaconate
    Dimethallyl itaconate
    Diethallyl itaconate
    Diallyl malonate
    Diallyl allylmalonate
    Diallyl citrate
    Triallyl citrate
    Diallyl fumarate
    Diallyl acetone
    Divinyl ether
    Diallyl ether
    Dimethallyl ether
    Glycol diacrylate (ethylene diacrylate)
    Glycol dimethacrylate
    Glyceryl diacrylate
    Glyceryl triacrylate
    Glyceryl dimethacrylate
    Glycol diethacrylate
    Divinyl benzene In order that those skilled in the art better may understand how the present invention is carried into effect the following illustrative examples are given, all parts being by weight.

*Example 1*

| | Parts |
|---|---|
| A. Acrylic acid | 19 |
|    Ethylene dimethacrylate | 1 |
| B. Methacrylic acid | 18 |
|    Diallyl itaconate | 2 |
| C. Methacrylic acid | 19 |
|    Allyl acrylate | 1 |
| D. Acrylic acid | 14 |
|    Dimethallyl ether | 2 |
|    Vinyl acetate | 4 |
| E. Acrylic acid | 14 |
|    Diallyl maleate | 2 |
|    Vinyl acetate | 4 |
| F. Methacrylic acid | 14 |
|    Ethylene dimethacrylate | 2 |
|    Vinyl acetate | 4 |
| G. Methacrylic acid | 9 |
|    Allyl acrylate | 2 |
|    Vinyl acetate | 9 |
| H. Acrylic acid | 14 |
|    Allyl acrylate | 2 |
|    Acrylonitrile | 4 |
| I. Acrylic acid | 16 |
|    Diallyl ether | 4 |
| J. Acrylic acid | 16 |
|    Ethylene dimethacrylate | 4 |
| K. Methacrylic acid | 16 |
|    Diallyl itaconate | 4 |
| L. Methacrylic acid | 16 |
|    Allyl acrylate | 4 |
| M. Acrylic acid | 16 |
|    Ethylene glycol maleate | 4 |
| N. Acrylic acid | 14 |
|    Dimethallyl ether | 4 |
|    Vinyl acetate | 2 |
| O. Acrylic acid | 14 |
|    Diallyl itaconate | 4 |
|    Styrene | 2 |
| P. Methacrylic acid | 14 |
|    Diallyl maleate | 4 |
|    Acrylonitrile | 2 |
| Q. Methacrylic acid | 12 |
|    Diallyl maleate | 4 |
|    Vinyl acetate | 4 |
| R. Methacrylic acid | 12 |
|    Ethylene dimethacrylate | 4 |
|    Styrene | 4 |
| S. Methacrylic acid | 12 |
|    Allyl acrylate | 4 |
|    Acrylonitrile | 4 |

In each of the separate monomeric mixtures, 1% benzoyl peroxide was dissolved as a polymerization accelerator. The mixtures were polymerized by allowing to stand in closed containers at room temperature for 48 hours followed by heating at 40° C. for 24 hours, 60° C. for 24 hours, and finally at 80° C. for 24 hours.

After grinding the polymerized resins they were tested for their ability to remove cations from solution by allowing a weighed sample of each resin to remain in contact with a standard sodium hydroxide solution for five minutes, filtering and titrating the filtrate with standard acid to determine how much the alkalinity of the water had been decreased by adsorption of the sodium ions. The efficiency was measured by calculating the ratio of sodium ions actually removed to the sodium ions theoretically removable if each of the carboxyl groups present in the copolymer had removed a sodium ion.

The results of these measurements are given in the following example.

*Example 2*

Copolymer of Example 1:

| | Efficiency, per cent |
|---|---|
| A | 49 |
| B | 36 |
| C | 43 |
| D | 66 |
| E | 39 |
| F | 23 |
| G | 35 |
| H | 39 |
| I | 42 |
| J | 34 |
| K | 41 |
| L | 37 |
| M | 34 |
| N | 54 |
| O | 29 |
| P | 46 |
| Q | 50 |
| R | 15 |
| S | 72 |

To test the resins to see if they could be regenerated, several of the above resins used in Example 2 were washed with hydrochloric acid and then with distilled water. They were retested as in Example 2 for their efficiency in removing sodium ions from solution. The results are given in the following example.

*Example 3*

| Treated copolymer of Example 1: | Efficiency, per cent |
|---|---|
| J | 35 |
| K | 41 |
| L | 41 |
| N | 58 |
| S | 78 |

It will be noted, by comparing the results of Examples 2 and 3, that the regenerated resins were at least as efficient as the original resins, and in several cases they were more efficient.

Although in the above examples I have used copolymers prepared from mixtures containing from 5 to 20% of a polymerizable compound containing a plurality of polymerizable groups, from 60 to 95% of a polymerizable compound containing carboxyl groups and from 0 to 20% of a polymerizable compound containing a single

grouping, it will be understood by those skilled in the art that other proportions may be used and that more than three polymerizable compounds may be used in preparing the copolymer. However, since the carboxyl groups are the active part of the resin in removing cations from solution and the compounds containing more than one polymerizable group cause the copolymer to be insoluble and infusible, I prefer that the copolymer contain a maximum amount of the compound containing carboxyl groups and a minimum amount of the other components commensurate with the desired insolubility. In general, the proportions illustrated by the examples are preferred.

Also, I may include an inert material such as diatomaceous earth (e. g., fuller's earth, including spent fuller's earth from petroleum refining processes), Alundum, coke, silica, cinders, porous glass, etc., as a carrier for the copolymer to increase the effective surface of the latter. This may be done by adding such carriers at any time prior to the complete polymerization of the copolymer to the infusible, insoluble state followed by complete polymerization. In this way the carrier is surface coated with the copolymer. An emulsion or dispersion type of polymerization is admirably suited for coating the carrier materials since it can be carried out by adjusting the concentration and type of dispersing or emulsifying agent so as to eliminate the necessity of grinding the copolymer before use since the product will be obtained in a finely divided state.

What I claim as new and desire to secure by Letters Patent of the United States is:

1. The method of treating liquid media to remove cations therefrom which comprises contacting such media with a mass comprising a substantial amount of an insoluble, infusible copolymer of a polymerizable mixture comprising (1) at least one compound having a polymerizable

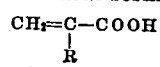

grouping and at least one other polymerizable grouping, the unsaturated bonds of said polymerizable groupings being non-conjugated with respect to each other, and (2) at least one acrylic acid having the structural formula $$CH_2=C-COOH$$
$$|$$
$$R$$

where R is a substituent selected from the class consisting of hydrogen, chlorine, bromine, monovalent alkyl radicals, monovalent aralkyl radicals, monovalent aryl radicals and monovalent alkaryl radicals.

2. The method of treating liquid media to remove cations therefrom which comprises contacting such media with a mass comprising a substantial amount of an insoluble, infusible copolymer of a polymerizable mixture comprising (1) at least one compound having a plurality of polymerizable

groupings, the unsaturated bonds of said polymerizable groupings being non-conjugated with respect to each other, and (2) at least one acrylic acid having the structural formula

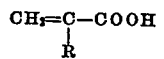

where R is a substituent selected from the class consisting of hydrogen, chlorine, bromine, monovalent alkyl radicals, monovalent aralkyl radicals, monovalent aryl radicals and monovalent alkaryl radicals.

3. The method as in claim 1 wherein the acrylic acid component comprises from 60 to 95% by weight of the polymerizable mixture.

4. The method as in claim 2 wherein the acrylic acid component comprises from 60 to 95% by weight of the polymerizable mixture.

5. The method which comprises depositing on an inert carrier a surface coating of a mass comprising a substantial amount of an insoluble, infusible copolymer resulting from the polymerization of a polymerizable mixture comprising (1) at least one compound containing a polymerizable

grouping and at least one other polymerizable grouping, the unsaturated bonds of said polymerizable groupings being non-conjugated with respect to each other, and (2) at least one acrylic acid having the structural formula $$CH_2=C-COOH$$
$$\quad\quad\quad\;|$$
$$\quad\quad\quad R$$

where R is a substituent selected from the class consisting of hydrogen, chlorine, bromine, monovalent alkyl radicals, monovalent aralkyl radicals, monovalent aryl radicals, monovalent alkaryl radicals, and contacting a liquid medium containing cations with the treated carrier to remove cations from the liquid medium.

6. The method of treating aqueous media to remove cations therefrom which comprises percolating such media through a mass comprising a substantial amount of an insoluble, infusible copolymer of a polymerizable mixture comprising (1) at least one compound having a polymerizable

grouping and at least one other polymerizable grouping, the unsaturated bonds of said polymerizable groupings being non-conjugated with respect to each other, and (2) at least one acrylic acid having the structural formula

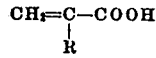

where R is a substituent selected from the class consisting of hydrogen, chlorine, bromine, monovalent alkyl radicals, monovalent aralkyl radicals, monovalent aryl radicals and monovalent alkaryl radicals.

7. The method as in claim 6 wherein the acrylic acid constituent of the polymerizable mixture is acrylic acid.

8. The method as in claim 6 wherein the acrylic acid constituent of the polymerizable mixture is methacrylic acid.

9. The method as in claim 6 wherein the acrylic acid constituent of the polymerizable mixture is alpha-chloroacrylic acid.

10. The method as in claim 6 wherein the compound containing a polymerizable

grouping is dimethallyl ether.

11. The method as in claim 6 wherein the compound containing a

grouping is diallyl maleate.

12. The method as in claim 6 wherein the

compound containing a grouping is ethylene dimethacrylate.

GAETANO F. D'ALELIO.

CERTIFICATE OF CORRECTION.

Patent No. 2,340,111. January 25, 1944.

GAETANO F. D'ALELIO.

It is hereby certified that error appears in the printed specification of the above numbered patent requiring correction as follows: Page 4, second column, line 39, strike out the words "compound containing a" and insert the same after "wherein the" in line 35, same page and column; and that the said Letters Patent should be read with this correction therein that the same may conform to the record of the case in the Patent Office.

Signed and sealed this 18th day of April, A. D. 1944.

Leslie Frazer

Acting Commissioner of Patents.

(Seal)